United States Patent [19]

Brod et al.

[11] Patent Number: 4,758,654

[45] Date of Patent: Jul. 19, 1988

[54] METHOD FOR TREATING RESIN IN A PURGE VESSEL

[75] Inventors: William B. Brod, New Fairfield, Conn.; Billy J. Garner, Charleston, W. Va.

[73] Assignee: Union Carbide Corporation, Danbury, Conn.

[21] Appl. No.: 43,597

[22] Filed: Apr. 28, 1987

[51] Int. Cl.$^4$ ............................................. C08F 6/02
[52] U.S. Cl. .................................. 528/483; 528/499; 528/503; 55/52; 55/54
[58] Field of Search .................... 528/483, 499; 55/52, 55/53, 54

[56] References Cited

U.S. PATENT DOCUMENTS

| | | | |
|---|---|---|---|
| 2,918,461 | 12/1959 | Flynn | 528/499 |
| 3,488,339 | 1/1970 | Carter | 528/483 |
| 4,314,053 | 2/1982 | Lin et al. | 528/483 |
| 4,332,933 | 6/1982 | DiDrusco et al. | 528/499 |
| 4,372,758 | 2/1983 | Bobst et al. | 55/48 |

Primary Examiner—Joseph L. Schofer
Assistant Examiner—F. M. Teskin
Attorney, Agent, or Firm—Clement J. Vicari

[57] ABSTRACT

A method for removing unpolymerized gaseous monomers from a solid olefin polymer in a single purge vessel while deactivating Ziegler-Natta catalysts and organometallic catalyst residues present in said solid olefin polymer by utilizing a two diameter purge vessel wherein hydrolysis of the catalysts are effected in the portion of the reactor having the smaller diameter with the gaseous monomers being removed in the larger diameter portion.

11 Claims, 1 Drawing Sheet

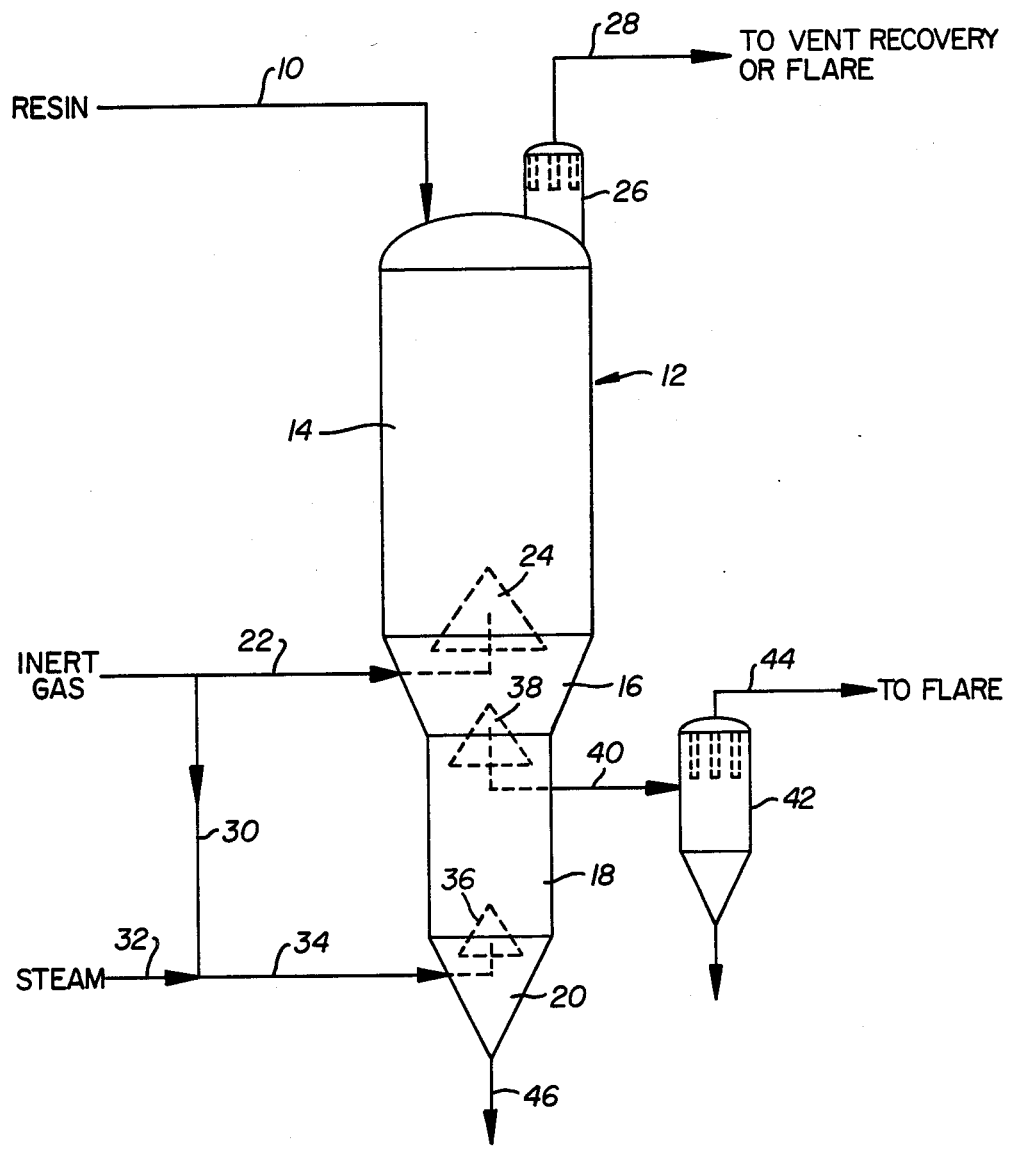

METHOD FOR TREATING RESIN IN A PURGE VESSEL

BACKGROUND OF THE INVENTION

1. Field of the Invention

The present invention relates to a water method for treating resin in a purge vessel and more particularly to a method for removing unpolymerized gaseous hydrocarbon monomers while deactivating catalyst from granular, low pressure-polymerized, low density ethylene hydrocarbon polymers.

2. Description of the Prior Art

It has long been known that olefins such as ethylene can be polymerized by contacting them under polymerization conditions with a catalyst comprising a transition metal compound, e.g., titanium tetrachloride and a cocatalyst or activator, e.g., an organometallic compound such as triethyl aluminum. Catalysts of this type are generally referred to as Ziegler catalysts.

Low density ethylene polymers (i.e. ethylene polymers having a density of about 0.94 g/cc and lower) have in the past been made commercially by a high pressure (i.e., at pressures of 15,000 psi and higher) homopolymerization of ethylene in stirred and elongated tubular reactors in the absence of solvents using free radical initiators. Recently, low pressure processes for preparing low density ethylene polymers have been developed which have significant advantages as compared to the conventional high pressure process. One such low pressure process is disclosed in commonly assigned, U.S. Pat. No. 4,302,565, the disclosure of which is hereby incorporated herein by reference. Ethylene polymers made by such a low pressure process may be formed into film by known techniques and such film is extremely tough and is useful in packaging applications.

The above-identified patent discloses a low pressure, gas phase process for producing low density ethylene copolymer having a wide density range of about 0.91 to about 0.94 g/cc and a melt flow ratio of from about 22 to about 36 and which have a relatively low residual catalyst content and a relatively high bulk density. The process comprises copolymerizing ethylene with one or more $C_3$ to $C_8$ alpha olefin hydrocarbons in the presence of a high activity magnesium-titanium complex catalyst prepared under specific activation conditions with an organo aluminum compound and impregnated in a porous inert carrier material. The copolymers (as applied to these polymers, the term "copolymers" as used herein is also meant to include polymers of ethylene with 2 or more comonomers) thus prepared are copolymers of predominantly (at least about 90 mole percent) ethylene and a minor portion (not more than 10 mole percent) of one or more $C_3$ to $C_8$ alpha-olefin hydrocarbons which should not contain any branching on any of their carbon atoms which is closer than the fourth carbon atom. Examples of such alpha-olefin hydrocarbons are propylene, butene-1, hexene-1,4-methyl pentene-1 and octene-1.

The catalyst may be prepared by first preparing a precursor from a titanium compound (e.g., $TiCl_4$), a magnesium compound (e.g., $MgCl_2$) and an electron donor compound (e.g., tetrahydrofuran) by, for example, dissolving the titanium and magnesium compounds in the electron donor compound and isolating the precursor by crystallization. A porous inert carrier (such as silica) is then impregnated with the precursor such as by dissolving the precursor in the electron donor compound, admixing the support with the dissolved precursor followed by drying to remove the solvent. The resulting impregnated support may be activated by treatment with an activator compound (e.g., triethyl aluminum).

The polymerization process can be conducted by contacting the monomers, in the gas phase, such as in a fluidized bed, with the activated catalyst at a temperature of about 30° C. to 105° C. and a low pressure of up to about 1000 psi (e.g., from about 150 to 350 psi).

The resulting granular polymers may contain gaseous unpolymerized monomers including hydrocarbon monomers. These gaseous monomers should be removed from the granular resin for safety reasons, since there is a danger of explosion if the hydrocarbon monomer concentration becomes excessive in the presence of oxygen. In addition, proper disposal of the hydrocarbon is required in order to meet environmental standards concerning hydrocarbon emissions.

The prior art teaches techniques for removing volatile unpolymerized monomers from polymers of the corresponding monomers. See for example, U.S. Pat. Nos. 4,197,399, 3,594,356, and 3,450,183.

More recently U.S. Pat. No. 4,372,758 issued Feb. 8, 1983 to R. W. Bobst et al and which is assigned to a common assignee discloses, a degassing or purging process for removing unpolymerized gaseous monomers from solid olefin polymers. The purging process generally comprises conveying the solid polymer (e.g., in granular form) to a purge vessel and contacting the polymer in the purge vessel with a countercurrent inert gas purge stream to strip away the monomer gases which are evolved from the polymer.

Unfortunately however in the process for producing polyethylene and polypropylene using Ziegler-Natta catalyst, catalyst and cocatalyst residues in resin entering the purge vessel are not deactivated by countercurrent purging with an inert gas stream as described above. These residues react with air and moisture on exiting the purge vessel and form alcohols, aldehydes, ketones, and alkanes. The alcohols, aldehydes, and ketones formed by reaction with oxygen contribute to resin odor. The alkanes formed by reaction with water require proper disposal in order to meet environmental standards concerning hydrocarbon emissions. In addition, the gaseous hydrocarbon products should be removed from the resin for safety reasons, since there is danger of explosion if the hydrocarbon concentration becomes excessive in the presence of oxygen.

The art has resorted to a moisture treatment of resin prior to exposing the catalyst and cocatalyst residues in the resin to the atmosphere (oxygen) which led to the addition of steam to the inert gas purge stream. The excess moisture required to drive the hydrolysis reaction toward completion was carried out in the vent stream from the top of the purge bin. The presence of moisture was not a concern when the purge bin vent stream was routed to a flare, but presented problems when the vent stream was sent to a monomer recovery unit. Removal of moisture from the purge bin vent stream was required to avoid monomer recovery unit processing problems such as condenser icing and to avoid recycle of moisture with monomer to the reactor which adversely affects catalyst productivity and resin product properties.

One solution for eliminating moisture from the purge bin vent stream was a dual molecular sieve bed drying system that required frequent regeneration with high temperature nitrogen plus a blower to overcome the pressure drop of the purge bin vent stream through the sieve bed. When high levels of moisture addition to the purge bin were required, this solution became unattractive due to limitations on molecular sieve bed size resulting in impractical regeneration frequencies and high regeneration nitrogen supply requirements.

Another solution for eliminating moisture from the purge bin vent stream was the use of two separate bins. One bin was used for dry inert gas purging of residual monomers from the resin with the vent from this bin routed to a monomer recovery unit. The second bin was used for moisture treatment of the resin with the vent from this bin routed to a flare. This solution became commercially unattractive due to the cost and increased space required to either increase the purge bin structure height to accommodate gravity flow of resin between bins or add conveying facilities to transfer resin from one bin to the other bin in a separate structure.

Other techniques for deactivating catalysts residue from polymer resins are disclosed for example in U.S. Pat. No. 4,029,877 issued June 14, 1977; U.S. Pat. No. 4,314,053 issued Feb. 2, 1982 and British patent No. 1,553,565 issued Oct. 3, 1979. These patents disclose the deactivation of the catalyst residues by utilization of water which reacts with the catalyst residues rendering them inactive. Unfortunately however the water treatment disclosed therein has the disadvantage that the monomers present in the polymer resin particles are subject to poisoning and require separate removal steps to remove the water from the monomer.

SUMMARY OF THE INVENTION

Broadly contemplated, the present invention provides a method for removing unpolymerized gaseous monomers from a solid olefin polymer in a single purge vessel while deactivating Ziegler-Natta catalysts and organometallic catalyst residues present in said solid olefin polymer which comprises conveying said polymer in a first inert gas stream including a conveying gas to a purge vessel having an upper zone, a lower zone and an intermediate zone connecting said upper zone to said lower zone, said upper zone having a diameter about 1.5 to 3.0 times the diameter of said lower zone, countercurrently contacting said polymer with a purge gas in said upper zone to produce a second gas stream discharging said second gas stream containing said purge gas, said conveying gas and said gaseous monomers, from said upper zone, directing said solid olefin polymer containing said catalysts from said upper zone through said intermediate zone and into said lower zone, feeding a second purge gas containing water into said lower zone in counter current contact with said solid olefin polymer, said water being present in said second purge gas in an amount sufficient to deactivate said Ziegler Natta catalysts and organometallic catalyst present in said solid olefin polymer, discharging said second purge gas from said lower zone immediately below said intermediate zone, and discharging from said lower zone said solid olefin polymer.

BRIEF DESCRIPTION OF THE DRAWING

The sole FIGURE is a schematic representative of the invention method utilizing a single purge vessel.

DESCRIPTION OF THE PREFERRED EMBODIMENTS

For purposes of ease of description only, the present invention will be described herein with reference to low pressure low density ethylene copolymers, although it is to be expressly understood that the invention is not to be limited thereby. Rather, it is intention to be limited only by the scope of the claims appended hereto. For example, the process of the present invention may be employed to treat solid olefin polymers other than low pressure-low density ethylene copolymers, such as homopolymers of ethylene and propylene and other copolymers of ethylene and propylene.

As used herein, the language "low pressure-low density ethylene copolymers" means copolymers of at least about 10 mole percent of at least one $C_3$ to $C_8$ alpha-olefin hydrocarbon comonomer (e.g., propylene, butene-1, hexene-1, 4-methyl pentene-1 and octene-1) which copolymerized under low pressure (e.g. 150 to 350 psi.) Such copolymers normally have a density no greater than about 0.94 g/cc and typically their density is from about 0.91 to about 0.94 g/cc. In addition, such copolymers generally have a narrow molecular weight distribution range (Mw/Mn) of about 2.7 to 4.5. A specific example of one method for preparing such copolymers is more fully described in the aforementioned U.S. Pat. No. 4,302,565 reference may be made to such applications for a more complete disclosure. The gas phase process disclosed in those applications produces granular polymers which may have an average particle size diameter on the order of about 0.03 to about 0.05 inch.

Depending upon the conditions of reaction and the particular hydrocarbon comonomer, the resulting solid low pressure-low density ethylene copolymers may contain an amount of gaseous unpolymerized monomers (which may include ethylene, one or more of the hydrocarbon comonomers, saturated hydrocarbons and non-reactive hydrocarbon olefins) which may be as high as about 1.5 to 4.5 weight percent. Environmental restrictions may prevent the direct venting to the atmosphere of such hydrocarbons and more importantly, safety considerations generally require the hydrocarbon content to be reduced to avoid the formation of an explosive mixture upon contact with oxygen.

In addition, the solid resin particles contain amounts of catalyst and cocatalyst residues which as mentioned previously should be deactivated so as not to impart discoloration and offensive odor to the polymer resins. Advantageously the removal of the monomers and discoloration of the catalyst residues and cocatalyst can be accomplished by the practice of the instant invention in a single purge vessel without the need for a separate treatment of the monomers as required by the prior art.

The process of the present invention is preferably applied to the deactivation of catalyst residues present in polymers obtained using the catalyst and cocatalyst according the U.S. Pat. No. 4,303,565.

Referring particularly to the drawing, olefin polymer resin, such as produced by the process disclosed in U.S. Pat. No. 4,303,565 is introduced in a first inert gas stream 10 to the top of a two diameter purge vessel 12, having an upper zone 14, wherein gaseous monomers are purged from the falling resin, an intermediate zone 16 and a lower zone 18 in which hydrolysis of the catalyst and cocatalyst residues take place, the lower zone being joined to a conical portion 20 of the reactor. The upper zone 14 of purge vessel 12 is substantially cylindrical and about 1.5 to 3.0 times and preferably about 2 times the diameter of substantially cylindrical lower zone 18.

Purge vessel 12 is designed such that the resin flows downward through the vessel in substantially plug flow fashion. By "plug flow" is meant equal movement of the resin particles throughout a cross-section of purge vessel 12 such that all of the resin particles have a substantially equal residence time in the vessel.

A dry inert purge gas 22 is introduced into purge vessel 12 through intermediate zone 16 at a site above lower zone 18 and is directed into the base of cone deflector 24 which is positioned between upper zone 14 and intermediate zone 16. Purge gas 22 then enters the upper zone 14 countercurrently against the falling olefin polymer resin.

The dry inert purge gas 22 sweeps away the gaseous monomers which evolve from the olefin polymer resin in the upper zone 14 and forms a gas stream containing dry inert purge gas 22, the first inert gas stream 10 and evolved monomer gases and is discharged from purge vessel 12 through filter 26 and thence to vent recovery or flare through line 28.

A portion of inert gas stream 22 can be diverted through line 30 and merged with steam stream 32 to form a moist purge gas stream 34 which is introduced into purge vessel 12 through conical zone 20. Moist purge gas stream 34 is routed into the base of internal flow cone 36 situated in the bottom of lower zone 18 and the top of conical zone 20, internal flow cone 36 being designed to provide plug flow of the resin. In addition, internal flow cone 36 provides a reasonably even distribution of moist purge gas flow in the hydrolyzing or lower zone 18. Situated at the bottom portion of intermediate zone 16 and the top portion of lower zone 18 is a collection cone 38. Collection cone vent 40 associated with collection cone 38 is designed to remove the gaseous hydrolysis products and moist purge gas to prevent moisture from entering the upper zone 14 of purge vessel 12. This side stream of hydrolysis products and gas are then directed through a conventional dust collector 42 and vented to a flare through line 44. Resin is discharged from conical zone 20 through line 46.

Conventional materials handling equipment and techniques can be employed in the process of the present invention. The minimum required residence time of the resin in upper zone 14 will depend on the initial monomer concentration in the resin and the final concentration desired and can be determined using known mass transfer calculation techniques. For low pressure low-density ethylene-1-butene copolymers, a residence time in the upper zone 14 of about one hour is typically required to reduce the hydrocarbon monomer concentration to a safe and environmentally acceptable level.

The residence time of the resin in the lower zone 18 will depend on the time required to hydrolyze the catalyst and cocatalyst residues. For a low pressure-polymerized ethylene-1-butene copolymer having a density of 0.918 g/cc, a 1.0 melt index, and a temperature of 75° to 80° C, a residence time of about 5 to 20 minutes is typical for hydrolysis.

Water is introduced to the lower zone by sparging steam into the diverted dry inert purge gas stream routed to the bottom of internal flow cone 36. Internal flow cone 36 is effective in providing plug flow of the resin and in giving a reasonably even distribution of moist purge gas flow. The sizing and positioning of the internal cones employed in the purge vessel is based on a method proposed by J. R. Johanson in "The Use of Flow Corrective Inserts in Bins," Transaction of the ASME, May, 1966.

A steam addition rate to the purge vessel in excess of the stoichiometric amount required to react with the catalyst and cocatalyst residues is utilized to drive the hydrolysis reaction toward completion. Steam addition rates ranging from about 100 to 3000 lb steam per million lb of resin are preferred, depending on the type and amount of catalyst and cocatalyst residues. Steam flow can be ratioed to the resin flow rate out of purge vessel 12 to maintain the 100 to 3000 lb steam per million lb of resin ratio.

To prevent resin handling problems caused by excessive moisture in the resin, it has been found necessary to ensure that steam does not condense before or after it is sparged into the inert purge gas. If required to prevent condensation, the inert purge gas fed to the bottom of the purge vessel can be heated to any temperature up to about the temperature of the resin. It has been found necessary to keep the resin temperature lower than its softening or melting point which in the case of low pressure low density ethylene copolymers is about 100°–110° C. It is preferred to add the steam to the inert purge gas as close as possible to the conical zone of purge vessel 12. It is also preferred that the inert purge gas flow to the lower zone 18 of purge vessel 12 be sufficient to maintain a moist purge gas dew point that is at least 5° C. below the minimum resin temperature in the purge vessel to avoid steam condensation. For cold climates, it may be necessary to increase the inert purge gas flow and/or insulate the lower zone 18 to prevent steam condensation on the inside walls of the purge vessel.

Pressures in purge vessel 12 can be varied however it is preferred to provide a low positive pressure in purge bin 12 since the rate of gaseous monomer diffusion is higher at lower pressures. Positive pressure in purge bin 12 should be maintained, first, to avoid a vacuum that could draw in air or oxygen and potentially create an explosive mixture with the hydrocarbon monomers, and secondly, to ensure proper operation of collection cone 38. To ensure removal of the moist purge gas stream from collection cone 38, pressures in purge vessel 12 at the collection cone must be greater than the flare pressure, plus line and dust collector 42 pressure losses. This $\Delta P$ driving force will create a flow pattern that will remove the bulk of the moisture through collection cone 38 thereby preventing water flow into upper zone 14 of purge bin 12. Although the proper pressure depends on many factors, those skilled in the art are capable of making that determination using known mass transfer and pressure drop calculation techniques.

The flow leaving purge vessel 12 through collection cone vent 40 is controlled at a rate which is greater than the moist purge gas flow 34 introduced beneath internal cone 36. This ensures that a certain amount of dry purge gas 22 is pulled downward from upper zone 14 of purge bin 12 to prevent steam from entering the purge vessel vent recovery system. The downward flow of dry purge gas around collection zone 38 picks up any random escaping moist purge gas and carries it out the collection cone vent 40.

The settled bed of resin that flows in substantially plug flow fashion downward through purge vessel 12 is composed of solid resin particles and void spaces between the solid resin particles. As resin enters the purge vessel, the void spaces contain conveying gas and evolving monomer gases. As the resin flows downward in the upper zone of purge vessel 12, dry purge gas introduced beneath internal flow cone 24 flows in a manner to displace the conveying gas and evolving monomer gases in the void spaces. As the resin flows downward to collection cone 38, the dry purge gas in the void spaces is carried downward with the resin. The amount of dry purge gas carried downward can be calculated and depends on the type of purge gas, purge vessel operating pressure, resin particle density, and resin settled bulk density. In addition to the dry purge gas carried downward in the void spaces, it is preferred that additional dry purge gas be pulled downward from the upper zone of purge vessel 12 and out collection cone 38 to protect against moisture migration upward in the bin. The amount of additional dry purge gas pulled downward can be typically twice the calculated amount of dry purge gas carried downward in the void spaces. The amount of dry purge gas introduced beneath internal flow cone 24 is equal to the flow upward countercurrent against the resin required to purge the resin to a specified hydrocarbon concentration plus the flow pulled downward to the collection cone 38.

As previously mentioned, collection cone 38 should be sized using the method of Johanson to achieve plug flow of the resin. It is preferred that, within collection cone 38 sizing constraints for plug flow, the separation between the bottom of the collection cone and the purge bin wall be specified such that the velocity of purge gas pulled downward through the annular space be comparable to the upward velocity of moist gas in the lower zone 18. This will minimize the likelihood of moisture migrating into the upper zone of purge vessel 12.

The resin above collection cone 38 will be dry and will still contain catalyst and cocatalyst residues. As a result, any small amounts of water which might escape into the upper zone 14 of purge vessel 12 will be absorbed by the resin and/or react with the catalyst and cocatalyst residues providing a moisture-free vent stream exiting the top of the purge vessel.

The inert purge gas employed in the practice of the present invention may be any gas which is inert both to the resin being purged and the particular gaseous monomers being removed. The preferred purge gas in nitrogen although other gases inert in the process may be employed. It is preferred that the nitrogen content of the purge gas be at least about 90% and that oxygen be excluded from the purge gas. The maximum permissible oxygen content varies depending upon the particular hydrocarbon monomer gas being stripped. As the concentration of hydrocarbons increase in the presence of oxygen, the danger of explosion also increases, and this level varies with different hydrocarbons. Ideally, there should be no oxygen in the purge gas although a small amount can be tolerated depending upon the hydrocarbon concentration in the purge vessel and the monomers being stripped. Those skilled in the art can easily determine the tolerable oxygen levels given a particular monomer. Of course, the inert purge gas may also include small amounts of the gaseous monomers, although as their concentration increases, their diffusion rate and hence the resin residence time will be affected as discussed above. Other advantages of employing relatively pure nitrogen as a purge gas are that more hydrocarbon gases can be stripped from the resin particles and any pure nitrogen that may be discharged with the exiting resins does not contribute to atmospheric emissions as would gases containing impurities. It is therefore preferred that the purge gas be pure nitrogen.

Monomer recovery can be effected by a variety of techniques. Since the catalyst and cocatalyst residues have been deactivated, the monomer recovery can be preferably recovered according to the process described in U.S. Pat. No. 4,372,758 and advantageously there is no need to further treat the monomers to remove water from the monomers.

The following example will illustrate the present invention.

EXAMPLE 1

An ethylene-butene copolymer (density 0.918 g/cc; 1.0 melt index) is prepared by the gas phase process disclosed in U.S. Pat. No. 4,302,565.

The catalyst was made up of titanium chloride, magnesium chloride, THF, diethyl aluminum chloride and tri(normal)hexyl aluminum supported on a silica based support. Triethylaluminum was used as a cocatalyst and introduced in the reactor at a rate of 6.04 g/min.

After a depressurization step, the granular resin was transferred from the reactor to a purge vessel as shown in FIG. 1 under an inert atmosphere. The resin was contacted with pure nitrogen in the upper zone 14 and with pure nitrogen and steam in the lower zone 18. The mass balance and stream temperature and pressures are indicated in Table I below with reference numerals from FIG. 1 being indicated for reference purposes.

TABLE I

| Description/Stream | 10 | 34 | 44 | 22 | 28 | 46 |
|---|---|---|---|---|---|---|
| Nitrogen (lb/hr) | 368 | 230 | 330 | 225 | 493 | — |
| Ethylene (lb/hr) | 250 | — | — | — | 250 | — |
| Butene (lb/hr) | 358 | — | — | — | 357.5 | 0.5 |
| Non-reactive hydrocarbons (lb/hr) | 189 | — | 4.6 | — | 188.7 | 0.3 |
| Resin (lb/hr) | 16537 | — | — | — | — | 16537 |
| Steam (lb/hr) | — | 3.3 | 0.6 | — | — | — |
| Total Flow Rate (lb/hr) | 17702 | 233.3 | 335.2 | 225 | 1289.2 | 16537.8 |
| Temperature (°C.) | 80 | 70 | 80 | 70 | 80 | 75 |
| Pressure (psig) | 15 | 4 | 3 | 4 | 3 | 3 |

An examination of the ethylene butene copolymer discharged from vessel 12 revealed that there was no odor present in the copolymer indicating that deactivation of the catalyst residues had taken place.

What is claimed is:

1. A method for removing unpolymerized gaseous monomers from a solid olefin polymer in a single purge vessel while deactivating Ziegler-Natta catalysts and organometallic catalyst residues present in said solid olefin polymer which comprises conveying said polymer in a first inert gas stream including a conveying gas, to a purge vessel having an upper zone, a lower zone and an intermediate zone connecting said upper zone to said lower zone, said upper zone having a diameter about 1.5 to 3.0 times the diameter of said lower zone, countercurrently contacting said polymer with a purge gas in said upper zone to produce a second gas stream, discharging said second gas stream containing said purge gas, said conveying gas and said gaseous monomers, from said upper zone, directing said solid olefin polymer containing said catalysts from said upper zone through said intermediate zone and into said lower zone, feeding a second purge gas containing water into said lower zone in counter current contact with said solid olefin polymer, said water being present in said second purge gas in an amount sufficient to deactivate said Ziegler Natta catalysts and organometallic catalyst present in said solid olefin polymer, discharging said second purge gas from said lower zone immediately below said intermediate zone, and discharging from said lower zone said solid olefin polymer.

2. A method according to claim 1 wherein said conveying gas in said first inert gas stream is nitrogen.

3. A method according to claim 1 wherein said purge gas in said upper zone is nitrogen.

4. A method according to claim 1 wherein said second purge gas in said lower zone is nitrogen.

5. A method according to claim 1 wherein said upper zone has a diameter about 2 times the diameter of said lower zone.

6. A method according to claim 1 wherein said water in said second purge gas in said lower zone is in the form of steam.

7. A method according to claim 6 wherein the steam addition rate to said purge vessel is in excess of the stoichiometric amount required to react with said catalyst and cocatalyst residues.

8. A method according to claim 1 wherein said solid olefin polymers in said purge vessel are maintained at temperature lower than the softening or melting point of said solid olefin polymer.

9. A method according to claim 1 wherein the flow of said inert purge gas to said lower zone is sufficient to maintain a moist purge gas dew point at least 5° C. below the minimum solid olefin polymer temperature in said purge vessel.

10. A method according to claim 1 wherein said solid olefin polymer is a low pressure polymerized low density ethylene-hydrocabron copolymer.

11. A method according to claim 10 wherein said low pressure polymerized low density ethylene-hydrocabron copolymer is an ethylene-butene copolymer.

* * * * *